United States Patent [19]

Noboru

[11] Patent Number: 4,838,773
[45] Date of Patent: Jun. 13, 1989

[54] SCROLL COMPRESSOR WITH BALANCE WEIGHT MOVABLY ATTACHED TO SWING LINK

[75] Inventor: Yoshinori Noboru, Gunma, Japan

[73] Assignee: Sanyo Electric Co., Ltd., Osaka, Japan

[21] Appl. No.: 632

[22] Filed: Jan. 5, 1987

[30] Foreign Application Priority Data

Jan. 10, 1986 [JP] Japan .................................... 61-4067

[51] Int. Cl.$^4$ ......................... F04C 18/04; F04C 29/00
[52] U.S. Cl. ......................................... 418/55; 418/57; 418/151
[58] Field of Search ........................... 418/55, 57, 151

[56] References Cited

U.S. PATENT DOCUMENTS

| | | | |
|---|---|---|---|
| 4,065,279 | 12/1977 | McCullough | 418/55 |
| 4,082,484 | 4/1978 | McCullough | 418/57 |
| 4,551,078 | 11/1985 | Hiraga | 418/57 |
| 4,580,956 | 4/1986 | Takahashi et al. | 418/151 |

Primary Examiner—John J. Vrablik
Attorney, Agent, or Firm—Wenderoth, Lind & Ponack

[57] ABSTRACT

A scroll compressor according to the present invention has a fixed scroll member and an orbiting scroll member, the latter being arranged in a juxtaposed relation with the former so that wraps thereof are fitted closely together, an electric motor having a driving shaft, and a swing link between the orbiting scroll member and the electric motor for transferring a rotational force generated by the electric motor to the orbiting scroll member. The swing link has an opening for receiving a boss of the orbiting scroll member and an eccentric opening to receive a driving pin of the driving shaft so that the orbiting scroll member orbits but does not rotate relative to the fixed scroll member. In the present invention, the swing link, which has a novel feature with respect to a positional relation established between the eccentric opening and the boss opening of the swing link, has a first member which is a main portion of the swing link and a second member which is a balance weight movably attached to the first member. The balance weight is limited in its movement in a radial direction of the rotary shaft.

5 Claims, 6 Drawing Sheets

SCROLL COMPRESSOR WITH BALANCE WEIGHT MOVABLY ATTACHED TO SWING LINK

BACKGROUND OF THE INVENTION

The present invention relates in general to a gas compressor for, for example, a refrigerating apparatus and an air conditioning system, and more particularly to a scroll compressor in which air or other gas is compressed to increase its pressure. Generally, the scroll compressor has an orbiting scroll member which includes an end plate and a spiral member or a wrap extending substantially in an involute curve and attached to one surface of the end plate in an upstanding position, and a fixed scroll member which is similar to the orbiting scroll member and is arranged in a juxtaposed relation thereto with the wraps of both members being fitted closely together. The orbiting scroll member is moved in an orbiting motion while rotation about its own axis is inhibited by an Oldham's ring disposed between, for example, the orbiting scroll member and a main frame or a housing. The orbiting movement of the orbiting scroll member reduces a sealed space or a fluid pocket defined by the two scroll members and thus compresses a gas therein to increase its pressure.

The structure and operational mechanism of the scroll compressor described above are old and have advantages when compared to an old piston-type compressor but, on the other hand, have disadvantages and problems of unsatisfactory sealing of a fluid pocket of the wraps, wear of the wraps, and pumping in and out of the used fluid. Attempts have been made to overcome these disadvantages as disclosed in U.S. Pat. Nos. 3884599 and 3924977. However, these attempts have not yet satisfactorily solved other problems related to damage during liquid compression and an increase of a pushing force of the two wraps when a rotational speed of an electric motor is changed.

In a scroll compressor, fluid pockets are formed between connected portions of the two cooperative wraps and the connected portions are moved toward the center along the surface of the wraps by a relative movement of the two scroll members. Under this movement, the fluid pocket moves toward the center to compress a fluid and, accordingly, a sealing of the moving connected portions must be fully insured. In order to try to obtain a desired sealing force, an attempt may be made to increase the connecting force of the wraps which, however, produces undesired wear of the wraps. Thus, the connecting force of the wraps must be determined to produce a suitable sealing force. However, the connecting force of the wraps is not always maintained constant when the orbiting scroll member is driven at a fixed crank radius, due to a production measurement error of the wraps and, reducing such a measurement error during production will undoubtedly be difficult.

Furthermore, if liquid compression occurs that is produced when a liquid refrigerant is introduced into a compression chamber, and one of the scroll members for the fluid compression is undergoing orbiting movement, there is a disadvantage in that the compressor body is vibrated by the orbiting movement of the scroll member. And, in particular, when a rotational speed of an electric motor for the orbiting movement is changed by, for example, inverter driving, a centrifugal force becomes increased by the orbiting scroll member undergoing orbiting movement and the connecting force of the wraps of the two scroll members is tremendously increased resulting in problematic wear of the wraps. These problems are not fully solved by the above-described U.S. Patents.

SUMMARY OF THE INVENTION

An object of the present invention is to provide a new scroll compressor which maintains a substantial dynamic balance when a rotational speed of an electric motor for driving a scroll member is rapidly and/or largely changed, so that vibration of the compressor itself is minimized.

Another object of the present invention is to provide a scroll compressor which, when liquid compression occurs due to liquid refrigerant entering the fluid, permits an orbiting scroll member to be disconnected from a fixed scroll member to release the fluid to thereby immediately recover the dynamic balance of the compressor.

A further object of the present invention is to provide an improved scroll compressor which has a swing link and a balancing weight movably supported on the swing link so that the compressor may meet various requirements and conditions of gas pressure increasing systems including a freezing apparatus, a refrigerating apparatus and an air conditioning apparatus.

Briefly, a scroll compressor according to the present invention has a fixed scroll member and an orbiting scroll member, the latter being arranged in a juxtaposed relation with the former so that wraps thereof are fitted closely together, an electric motor having a driving shaft, and a swing link between the orbiting scroll member and the electric motor for delivering rotational force generated by the electric motor to the orbiting scroll member. The swing link has an opening for receiving a boss of the orbiting scroll member and an eccentric opening in which an eccentric driving pin of the driving shaft is received so that the orbiting scroll member orbits but does not rotate relative to the fixed scroll member. In the present invention, the swing link has a first member which is a main portion of the swing link and a second member which is a balance weight movably attached to the first member. The swing link has the center of mass thereof positioned so that said swing link generates a centrifugal force smaller than that of the orbiting scroll member in a diametrically opposite direction relative to the centrifugal force of the orbiting scroll member, and in such a manner that a sealing force between the wraps of the above-described two scroll members is formed by both a difference between a centrifugal force of the orbiting scroll member and a centrifugal force of the swing link and a component of force generated by a gas pressure. The balance weight is limited in its movement in a radial direction of the rotary shaft.

In the present invention, an eccentric distance of the driving pin (distance between a center of the driving shaft and a center of the driving pin) is larger than a radius of the orbiting movement defining the orbiting scroll member so that a center of the boss opening of the first member is spaced from a center of the driving shaft by a radius defining the orbiting movement; and that a center of the eccentric opening and the center of the driving shaft are located on the same side of a first line extending at a right angle to a second line connecting the center of the boss opening to the center of the driving shaft and extending through the center of the boss opening; and that the center of the driving pin is located in an offset position in a counter-clockwise direction of the driving shaft relative to a third line, that extends at a right angle to the above-described second line which extends from the center of the boss and the center of the driving shaft, and extends through the center of the driving shaft.

As described above, the swing link has a movable balance weight so that the eccentricity of the orbiting scroll member relative to the fixed scroll member can be adjusted automatically by the balance weight, a sealing effect between the wraps of the two scroll members can be improved and liquid compression occurring at an unusually high pressure operation is prevented by disconnecting the wraps of the two scroll members.

DETAILED DESCRIPTION OF THE PREFERRED EMBODIMENTS

Figure 1:
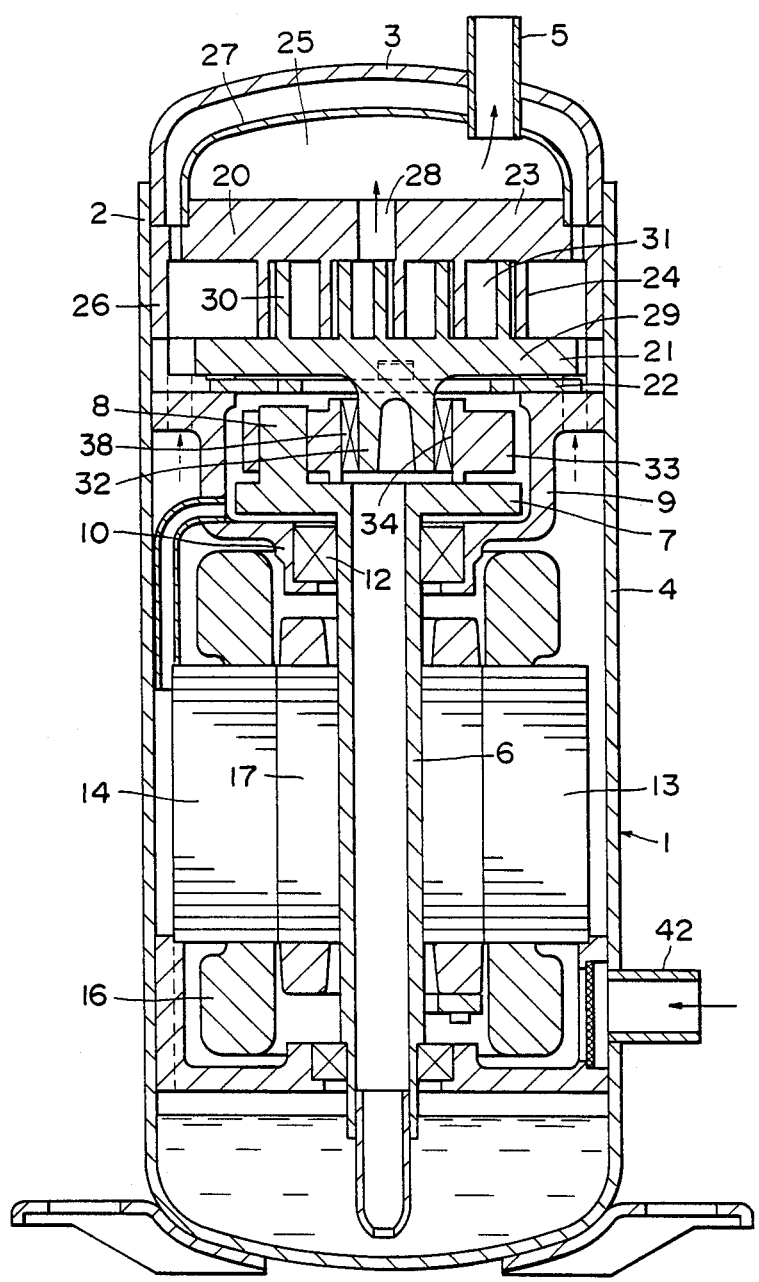
FIG. 1 is a longitudinal sectional view of a scroll compressor in accordance with the present invention.
Figure 2:
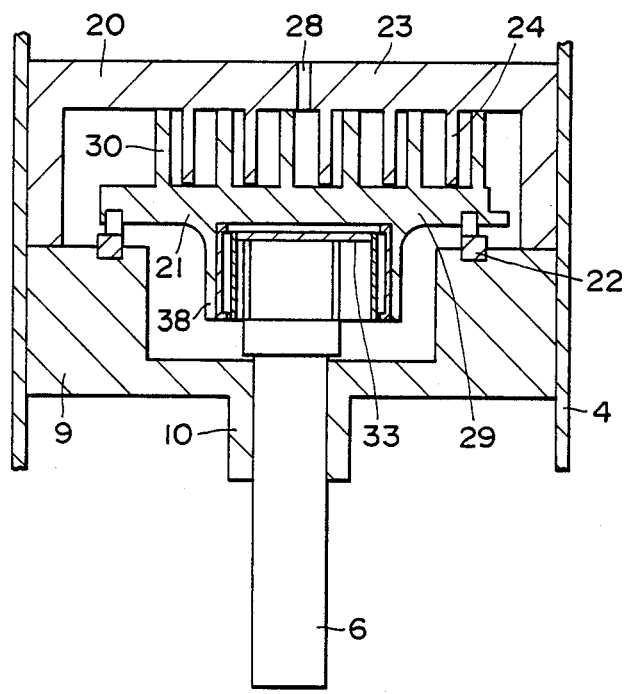
FIG. 2 is an illustration showing a part of the scroll compressor according to the present invention.

Referring first to FIGS. 1 and 2, a scroll compressor 1 of the invention has a cup-like cylindrical casing 2 having a closed bottom end and an open upper end and an upper closure member 3 collectively constituting a housing 4. The upper closure member 3 has an exhaust pipe 5 through which fluid is discharged out of the apparatus. The upper closure member 3 is press-fitted to the cylindrical casing 2 comprised of steel and the press-fitted portion is welded by a known suitable method.

A driving shaft 6 has at its upper end a large-diameter portion 7, which has an eccentric driving pin 8 projecting axially from a portion spaced from a center thereof. The driving shaft 6 is rotatably secured by a ball bearing 12 in the bearing portion 10 of the frame 9.

The electric motor 13 has a rotor 17 and a stator 14 having a winding 16, and the rotor 17 is rotated by supplying electric current to the winding 16 to deliver a rotational force to the driving shaft 6.

In the cylindrical casing 2 are a fixed scroll member 20, an orbiting scroll member 21, a driving mechanism for the orbiting scroll member and an Oldham ring 22. The fixed scroll member 20 generally has an end plate 23, a wrap 24 attached to one surface of the end plate 23 in an upstanding posture and extending substantially in an involute curve, and an annular wall 26. The fixed scroll member 20 is fixed to the frame 9 by means of bolts or any other suitable fixing means. An exhaust muffler 27 is disposed on the other surface of the end plate 23 to define an exhaust port 25 therebetween. The exhaust muffler 27 has the exhaust pipe 5 and the exhaust port 25 is connected to an exhaust opening 28 which is formed in a center of the end plate of the fixed scroll member 20.

The orbiting scroll member 21 has an end plate 29, and a wrap 30 attached to one surface of the end plate 29 in an upstanding posture and extending substantially in an involute curve. The wrap 30 of the orbiting scroll member 21 is associated with the wrap 24 of the fixed scroll member 20 and offset thereto by 180° so that the wraps of the two scroll members 20, 21 fit closely together to form a fluid pocket 31 therebetween. The orbiting scroll member 21 is connected to a driving mechanism, which will be described presently, and is driven to undergo an orbiting movement over a circle having a radius OP (FIGS. 3A–3C and FIG. 9) to compress the refrigerant gas within the wraps of the two scroll members 20, 21. During this movement, Oldham ring 22 prevents the orbiting scroll member 21 from rotating relative to the fixed scroll member 20.

A radius OP of the circle is determined by the formula:

((Pitch of Wrap)−2X (Wall Thickness of Wrap))/2

Next, the driving mechanism for the orbiting scroll member 21 will be explained. As described above, the driving shaft 6 which is rotatably supported by the ball bearing 12 at the bearing portion 10 of the frame 9 has a large-diameter portion 7 which has the driving pin 8 extending from a position spaced or offset from the center of the driving shaft 6. The orbiting scroll member 21 has a boss 32 at a lower surface of the end plate 29 that has the wrap 30 on the upper surface thereof, and a center of the boss 32 in the illustrated embodiment is axially aligned with a center of the spirally shaped wrap 30 of the orbiting scroll member 21. The boss 32 is inserted into a boss opening 34 of a swing link 33 and is rotatably supported thereon by a needle bearing 38. The swing link 33 has a semi-circular portion 56 and an opening 36 in the portion 56 for movably receiving therein a balance weight 35. The swing link 33 also has an eccentric hole 37 which is formed at a position spaced or deviated from a center of the driving shaft 6 and the driving pin 8 is rotatably fitted to the eccentric hole 37.

The balance weight 35 in the embodiment of FIGS. 3A–3C and 4 has two oval openings 40 for freely receiving guide pins 39 which extend in the same direction as the driving pin 8 of the large-diameter portion 7 of the driving shaft 6. Due to the provision of the oval openings 40, when the swing link 33 is pivoted about the driving pin 8 extending in the eccentric hole 37, movement of the balance weight 35 is limited by the guide pins 39 and the balance weight 35 does not follow the movement of the swing link 33.

Figure 3A:
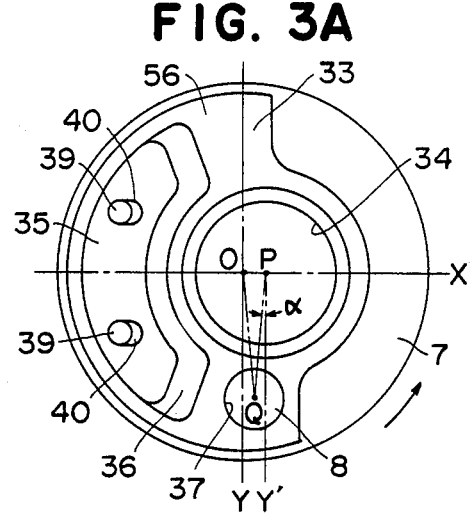
FIGS. 3A, 3B and 3C are plan views of a swing link which has a balance weight movable relative to a swing link and a driving shaft, illustrating the operation of the balance weight.
Figure 4:
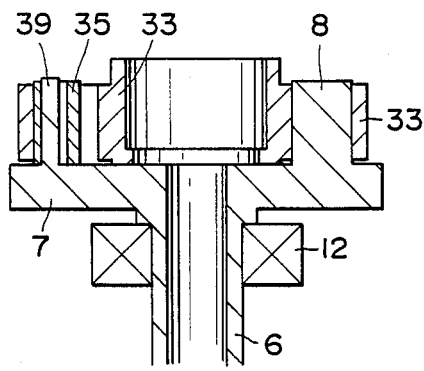
FIG. 4 is a sectional view of the swing link and a driving shaft shown in FIGS. 3A–3C, FIGS. 5A, 5B and 5C are plan views of a swing link and a driving shaft according to another embodiment of the invention.
Figure 9:
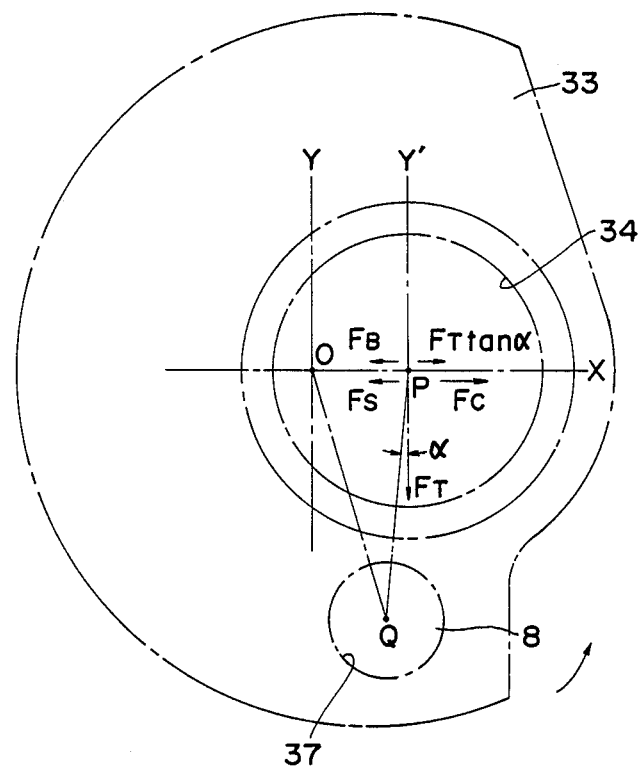
FIG. 9 is an illustration illustrating the operation and effect of the swing link according to the present invention.

A positional relationship with respect to a center O of the driving shaft 6, a center P of the boss opening 34 of the swing link 33, the eccentric hole 37, namely, a center Q of the driving pin 8 is shown in FIGS. 3A and 9. The distance between the center O of the driving shaft 6 and the center P is selected to be the radius OP of the aforementioned orbiting circle, and the center Q of the driving pin 8 and the center O of the driving shaft 6 are located on the same side of a first line Y'. The line Y' extends through center P and at a right angle to a second line X. The second line X extends between the center P of the bos opening 34 and the center O of the driving shaft 6. The center Q of the driving pin 8 is located in a position shifted in a counterclockwise direction of the driving shaft 6 relative to a third line Y. The third line Y extends at a right angle to the second line X and through the center O of the driving shaft 6.

In the structure of the driving mechanism described above, the center P of the swing link 33 can move over a circle having a center Q and a radius QP. In other words, when the driving shaft 6 is rotated counterclockwise, the swing link 33 is driven by the driving pin 8 so that the center P of the swing link 33 is isolated from the center O of the driving shaft 6, and the wrap 30 of the orbiting scroll member 21 abuts against a side wall of the wrap 24 of the fixed scroll member 20. Consequently, the center P of the orbiting scroll member moves in the predetermined orbiting movement around the center O of the driving shaft 6 with a radius OP. At this moment, rotation of the orbiting scroll member 21 is prevented by the Oldham ring 22 and, accordingly, the orbiting scroll member 21 undergoes orbiting movement and not rotation. In contrast, the swing link 33 is rotated at the same speed as the driving shaft 6. Due to the orbiting movement of the orbiting scroll member 21, the fluid pocket constituted by the cooperative arrangement of the two wraps is moved to establish compression of the fluid. The gas to be compressed is supplied into a hermetically sealed compressor structure 1 through a fluid inlet port 42 of the cylindrical casing 2. The compressed gas is discharged into the exhaust muffler 27 from the exhaust opening 28 of the end plate 23 of the fixed scroll member 20 and exhausted out of the exhaust muffler 27 through the exhaust pipe 5 of the upper closure member 3. A contact portion of the wraps 24, 30 of the two scroll members 20, 21 is always located in the same plane passing through the above-described centers O and P.

When the orbiting scroll member 21 is driven by using the swing link 33 having the eccentric hole 37, a mutual pressing force at the contact portion of the wraps 24, 30 is automatically obtained by a reaction of the fluid (gas) compression and, consequently, a sealing effect of the fluid pocket is established. Furthermore, the center P of the swing link 33 is rotatable around the center Q of the driving pin 8 and, accordingly, the distance between the center P of the boss opening 34 of the orbiting scroll member 21 and the center O of the driving shaft 6 may be changed in accordance with the centrifugal force and the reaction of the fluid.

The balance weight 35 according to the present invention functions to reduce a centrifugal force $F_c$ resulting from an orbiting operation of the orbiting scroll member 21 as well as the swing link 33 and the ball bearing 12, and a centrifugal force $F_s$ of the swing link 33 including the balance weight 35 is determined to be slightly less than the centrifugal force $F_c$.

Figure 3B:
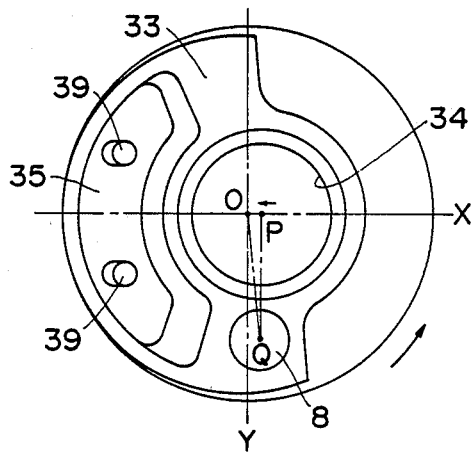
Figure 3C:
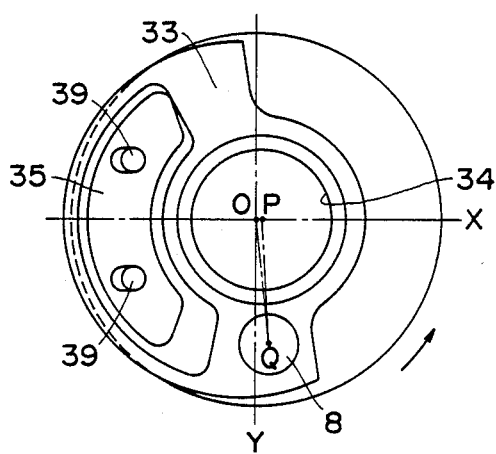
Figure 9A:
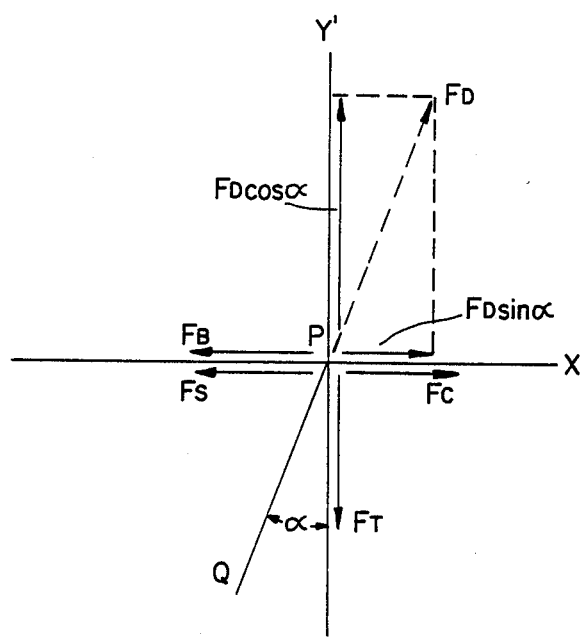
FIG. 9a is a free body diagram further illustrating the forces acting at point P in FIG. 9.

As illustrated in FIGS. 3A-3C and 4, the balance weight 35 is formed separate from the swing link 33 and is movably disposed in the opening 36 formed in the semi-circular portion of the swing link 33, and the movement of the balance weight 35 is guided and limited by the guide pins 39 formed on the large-diameter portion 7 of the driving shaft 6. In the structure described above, when the swing link 33 is pivoted about the driving pin 8 (FIG. 3C), the balance weight 35 which has been in contact with the inner wall of the opening 36 of the semi-circular portion 56 illustrated in FIGS. 3A and 3B is separated from the inner wall while the same is guided by the guide pins 39 so that a centrifugal force $F_s$ of the balance weight 35 is not imparted to the swing link 33. In other words, when the swing link 33 is driven so that the wrap 30 of the orbiting scroll member 21 is moved away from the wrap 24 of the fixed scroll member 20 by a liquid compression in the fluid pocket 31, the centrifugal force $F_c$ imparted the orbiting scroll member 21 becomes relatively larger in an amount directly proportional to a reduction of the centrifugal force $F_s$ of the balance weight which acts in the opposite direction of the centrifugal force $F_c$ of the orbiting scroll member 21, and when the liquid compression is ceased, the swing link returns to its original condition. First, referring to FIG. 9a, the forces acting at P are as follows:

$$\Sigma F_x: F_D \sin \alpha + F_c = F_B + F_S \quad (1)$$

$$\Sigma F_y: F_D \cos \alpha = F_T \quad (2)$$

wherein $F_c$: centrifugal force of the orbiting scroll member
$F_B$: the radial component of the load exerted by gas being compressed
$F_S$: centrifugal force of the balance weight
$F_T$: the tangential component of the load exerted by the compressed gas
$F_D$: the counteracting force at drive pin 8 having center Q, i.e. the driving force exerted by the drive pin.

It follows from eq. (2) above:

$$F_D = F_T/\cos \alpha \quad (3)$$

Multiplying both sides of eq. (3) by sin α

$$F_D \sin \alpha = F_T \sin \alpha / \cos \alpha = F_T \tan \alpha. \quad (4)$$

Now, with reference to FIG. 9, a lateral force F is determined as follows:

$$F = (F_c - F_s) + (F_T \tan \alpha - F_B)$$

In the conditions of $F_c > F_s$, $F_T \tan \alpha < F_B$ and a normal condition of pressure, all conditional components are determined so that the unequality $F > O$ is satisfied. Similarly all conditional components are determined to satisfy the unequality $F < O$ when $F_B$ becomes abnormally large. Thus, when the value of $F_T$ becomes larger than a certain value, the contact portions of the scroll wraps 24, 30 are separated from each other to open the gas pocket to prevent the liquid compression.

Figure 5A:
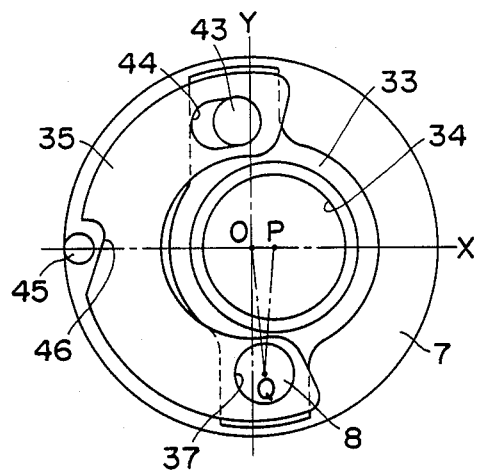
Figure 6:
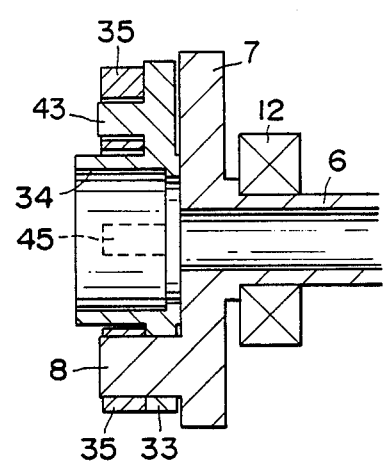
FIG. 6 is a sectional view of the swing link and the driving shaft shown in FIGS. 5A–5C, FIGS. 7 and 8 are a plan view and a sectional view, respectively, of a swing link according to a further embodiment of the present invention.
Figure 5B:
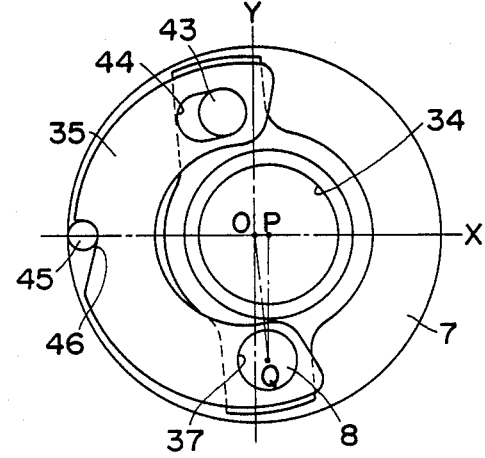
Figure 5C:
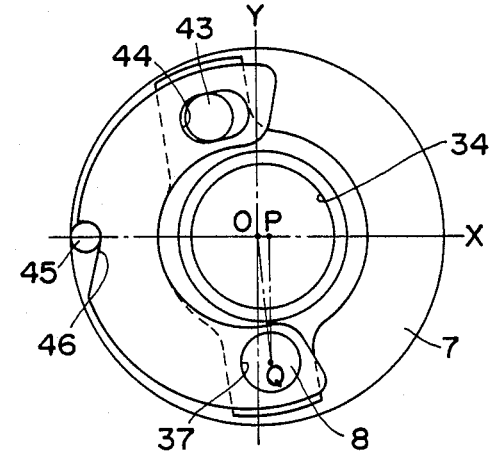

Referring next to FIGS. 5A-5C and 6 which show another embodiment of the present invention, the swing link 33 does not have a semi-circular portion 56 of the embodiment of FIGS. 3A-3C and 4, but has a pin 43. In this embodiment, a balance weight 35 has a guide opening for laterally movably receiving the pin 43 of the swing link 33. The large-diameter portion 7 of the driving shaft 6 has a stopper pin 45 while the balance weight 35 has a notch 46 which will contact the stopper pin 45 to prevent excessive rotational movement of the balance weight 35 (FIG. 5A). Namely, the swing link 33 in this embodiment contacts the balance weight 35, a pivotal movement of which is limited by the pin 45 of the large-diameter portion 7 of the driving shaft 6 (FIG. 5B). Thus, the orbiting scroll member 21 and the swing link 33 do not contact any portions of the frame 9 when these elements 21, 33 are driven or swivelled about the driving pin 8 of the driving shaft 6 (FIG. 5C).

With the swivelling movement of the swing link 33 about the driving pin 8, the degree of eccentricity of the orbiting scroll member 21 is changed so that the contacting portions of the wraps 24, 30 of the two scroll members 20, 21 are moved closer to each other during normal operation and, on the other hand, are moved away from each other during liquid compression.

A force imparted to the center P of the swing link 33 will be understood from FIG. 9. During a normal operation, the following formula (1) is satisfied with the forces acting at the center of the swing link 33.

$$F_B - F_T \tan \alpha < F_c - F_s \qquad (1)$$

In contrast, during an abnormal, high pressure operation, the following formula (2) is satisfied.

$$F_B - F_T \tan \alpha > F_c - F_s \qquad (2)$$

To be more specific, the angle α can be determined in connection with the boss opening 34 and the center O of the driving shaft 6 at the time when the eccentric hole 37 (or Q in FIG. 9) is formed in the swing link 33 and, if dimensional values such as height, thickness and the radii of curvature of the wrap of the scroll members have been determined, a ratio of $F_B$ to $F_T$ can be obtained as a specific value for the scroll compressor. Accordingly, with the dimensional values determined, the value of the $F_B - F_T \tan \alpha$ in the above formulas (1) and (2) is proportional to a gas pressure of the fluid pocket 31 (FIG. 1) formed by the two wraps 24, 30. In contrast, the value of the centrifugal forces $F_c - F_s$, if a rotational speed of the driving shaft 6 is constant, is prescribed by the design or dimension of the orbiting scroll member 21 and the swing link 33. Therefore, either the formula (1) or (2) is satisfied by gas pressure in the fluid pocket 31.

In the present invention, during normal operation in which gas pressure of the fluid pocket 31 does not increase above a prescribed value, a contact force of the two wraps is produced by the centrifugal force to satisfy the above formula (1) and, on the other hand, if the gas pressure exceeds the prescribed value, a force which is larger than the contacting force (i.e., $F_c - F_s$) of the two wraps produced by the difference of the centrifugal forces is produced by the gas in the fluid pocket. Under this larger force, the contacting force of the two wraps is released to avoid an abnormal increase of the gas pressure within the fluid pocket.

Therefore, the swing link 33 functions to produce a contacting force between the two wraps 24, 30 of the scroll members 20, 21 during normal operation and to release the thus produced contacting force so that the wrap 30 of the orbiting scroll member 21 is moved away from the wrap 24 of the fixed scroll member 20.

Figure 7:
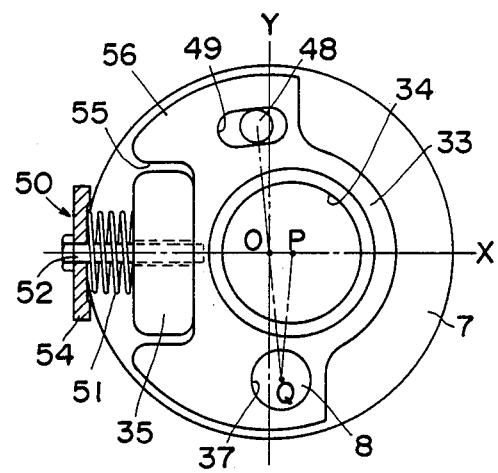
Figure 8:
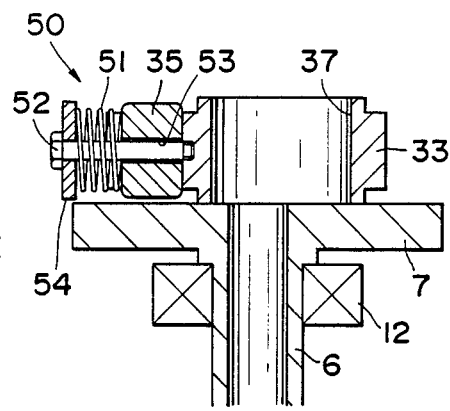

FIGS. 7 and 8 show a further embodiment of the invention in which a balance weight holder 50 is provided to resiliently holding a balance weight 35 so as to reduce the difference between a centrifugal force $F_c$ of the orbiting scroll member 21 and a centrifugal force $F_s$ of the balance weight 35 when such a difference becomes large, by automatically increasing the centrifugal force exerted by the balance weight 35.

In the embodiment of FIGS. 7 and 8, the swing link 33 has a recess 55 extending in a semi-circular portion 56 in which the balance weight 35 is secured. The swing link 35 has an eccentric hole 37 at a position offset from the center of the driving shaft 6 so that the driving pin 8 is rotatably secured in the eccentric hole 37. Furthermore, the swing link 33 has an oval opening 49 to freely receive a pin 48 which is fixed to, and projects from, the large-diameter portion 7 of the driving shaft 6. The oval opening 49 functions to limit a swivelling angle of the swing link 28 when same is rotated about the driving pin 8 in the eccentric hole 37.

The balance weight holder 50 which resiliently holds the balance weight in the recess 55 of the swing link 33 has a bolt 52, which extends through a through-hole 53 of the balance weight 35 and threadedly engages a threaded hole formed in the swing link 33, a ring 54 fitted to the bolt 52 at its head portion, and a coil spring 51 extending between the ring 54 and the balance weight 35 and around the bolt 52. The coil spring 51 resiliently urges the balance weight 35 toward the swing link 33. The through-hole 53 of the balance weight 35 has a diameter larger than a diameter of the bolt 52. Thus, the balance weight 35 is outwardly movable against a resilient force exerted by the coil spring 51.

As will be apparent from the foregoing description, the embodiment of FIGS. 7 and 8 is premised in that the rotation (i.e. the speed of rotation) of the orbiting scroll member is variable and changes greatly while the embodiment of FIGS. 1-5 is premised in that the speed of rotation is generally constant and is not changed substantially. Specifically, in an inverter driving mode, or when dual frequency driving is prevalent such as in Japan where two frequency modes are used (60 Hz in the Osaka area and 50 Hz in the Tokyo area) the resultant centrifugal force ($F_c - F_S$) tends to become abnormally large when the compressor is driven at the relatively higher speed in either of the situations described above. Therefore, the lateral force (F) which acts to press the orbiting scroll member against the fixed scroll member tends to become abnormally large resulting in a high degree of wear in the members, or a frictional resistance being developed which inhibits the members from sliding relative to one another and damage to the rotary portions and elements of the compressor due to such resistance. In the embodiment of FIGS. 7 and 8, during relatively high-speed operation, the increase in the centrifugal force of the balance weight acts to move the balance weight 35 radially outward on bolt 52 against the resilient force of spring 51 whereby the center of mass of the balancing weight is displaced outwardly with respect to center O. Therefore, during the relatively high-speed operation, since the center of mass of the balance weight is located further radially outward with respect to center O than during a lower speed operation, the centrifugal force $F_S$ of the balancing weight is greater at the higher speed operation whereby the resultant centrifugal force ($F_c - F_S$) is lower during high speed operation than what it would be if the balance weight did not move radially outwardly on bolt 52. In other words, the resultant centrifugal force ($F_c - F_S$) can remain somewhat constant during varying operation speeds due to the ability of the center of mass of the balance weight to be displaced radially outwardly from center O in amounts proportional to an increase in the operation speed while the center of mass of the orbiting scroll member remains at a constant distance from the center O;

According to the embodiments shown in FIGS. 3 and 5, a degree of eccentricity of the orbiting scroll member is changed by the swing link to improve the sealing effect between the wraps of the two scroll members, and to separate the wraps from each other when an abnormally high pressure occurs, such as one occuring at liquid compression, in the wraps to thereby prevent wear or damage of the wraps. Furthermore, when the swing link having a unique balance weight is swivelled during an abnormally high generation of pressure, the balance weight which is separated from the swing link provides a larger centrifugal force to the orbiting scroll member than a centrifugal force of the swing link. Consequently, the swing link is returned to its original position by the centrifugal force of the orbiting scroll member to return the compression mechanism to compress the fluid in the fluid pocket of the wraps.

Although the present invention has been described with reference to the preferred embodiments, many modifications and alterations can be made within the spirit of the invention.

What is claimed is:

1. A scroll compressor for compressing gas, said compressor comprising:
   a fixed scroll member having an end plate and a wrap attached to one surface of said end plate, said wrap extending in an involute curve;
   an orbiting scroll member having an end plate, a wrap attached to one surface of said end plate of the orbiting scroll member, and a boss on the other surface of said end plate of the orbiting scroll member;
   said wrap of said orbiting scroll member juxtaposed with that of said fixed scroll member and disposed adjacent thereto;
   an electric motor, a driving shaft operatively connected to said electric motor for being driven thereby to rotate in a counter-clockwise direction, and an eccentric driving pin integral with said shaft and eccentric with respect to an axis of rotation of said shaft for rotating with said shaft eccentrically about said axis of rotation;
   a swing link operatively connected between said orbiting scroll member and said driving shaft for tranferring a rotational force generated by said electric motor to said orbiting scroll member through said driving shaft,
   said swing link having a boss opening therein in which said boss of the orbiting scroll member extends and an eccentric opening therein in which said driving pin extends,
   said swing link also having a center of mass of such a magnitude and defined at such a location with respect to the center of mass of said orbiting scroll member that said swing link generates a centrifugal force that is smaller than that generated by said orbiting scroll member and that acts in a diametrically opposite direction relative to the centrifugal force generated by said orbiting scroll member as said swing link and said orbiting scroll member are rotated by said electric motor through said driving shaft; and
   wherein the following conditions are satisfied:
   a first distance between the center of said driving shaft and the center of said eccentric opening is larger than the radius of a circle along which said orbiting scroll member orbits, and the center of said boss opening is spaced from the center of said driving shaft, and
   the center of said eccentric opening is located at the same side of a first straight line as is the center of said driving shaft, said first straight line extending through the center of said boss opening at a right angle to a second straight line, said second straight line extending between the center of said boss opening and the center of said driving shaft, and the center of said eccentric opening is located in a position offset in said counter-clockwise direction from a third straight line, said third straight line extending through the center of said driving shaft at a right angle to said second straight line, said position located within ninety degrees of said third straight line as taken in said counter-clockwise direction therefrom toward said second straight line and said position also located between said first straight line and said third straight line,
   the difference between the centrifugal force exerted by said orbiting scroll member during normal operation of the compressor and the centrifugal force exerted by said swing link being greater than a resultant component of force, including a component of force exerted by the compressed gas, acting on said orbiting scroll member along said second straight line to create a sealing force between said wraps.

2. A scroll compressor as claimed in claim 1, wherein said swing link comprises a main portion and a balance weight movably attached to said main portion.

3. A scroll compressor as claimed in claim 2, wherein said main portion is semi-circular and has an opening extending therein, and said balance weight is movably retained in said opening by guide pin means.

4. A scroll compressor as claimed in claim 2, wherein said balance weight has an opening and a notch therein, said swing link has a respective driving pin extending in said opening of the balance weight for movably retaining said balance weight, and said driving shaft has a stopper pin for engaging said swing link within said notch to limit pivotal movement of said balance weight about said eccentric driving pin.

5. A scroll compressor as claimed in claim 2, wherein said swing link has a recess extending therein, and said balance weight is resiliently movably retained in said recess by a spring.

* * * * *